United States Patent [19]

Saetti

[11] 4,076,334
[45] Feb. 28, 1978

[54] TRACK FOR TRACK LAYING AGRICULTURAL TRACTORS AND LIKE VEHICLES

[75] Inventor: Renato Saetti, Turin, Italy

[73] Assignee: Fiat Trattori S.p.A., Modena, Italy

[21] Appl. No.: 719,483

[22] Filed: Aug. 31, 1976

[30] Foreign Application Priority Data

Sep. 26, 1975 Italy .................................. 69397/75

[51] Int. Cl.² ............................................ B62D 55/28
[52] U.S. Cl. ..................................................... 305/54
[58] Field of Search ...................... 305/54, 55, 53, 39, 305/35 R, 13, 19, 40; D15/28

[56] References Cited

U.S. PATENT DOCUMENTS

| 2,404,486 | 7/1946 | Hait ..................................... 305/54 X |
| 3,188,150 | 6/1965 | Sandgänger ........................ 305/35 R |

*Primary Examiner*—Robert B. Reeves
*Assistant Examiner*—John P. Shannon

*Attorney, Agent, or Firm*—Sughrue, Rothwell, Mion, Zinn & Macpeak

[57] ABSTRACT

A track for a track-laying vehicle such as an agricultural tractor comprising a plurality of links pivoted together to form a closed loop chain, each link having bolted thereto a sole plate equipped with one or more ground-engaging cleats is disclosed. Sole plates on alternate links are of one type having two or more cleats aligned with one another across the width of the track and separated by a space of the same order as the width of each cleat, and between these sole plates are sole plates of another type having one or three cleats all aligned with one another across the width of the track. The single or central cleat is longitudinally aligned with the space between cleats of the sole plate of the first type and the outer cleats, if provided, are separated from the central cleat by respective spaces longitudinally aligned with the two cleats of the sole plates of the first mentioned type.

2 Claims, 5 Drawing Figures

TRACK FOR TRACK LAYING AGRICULTURAL TRACTORS AND LIKE VEHICLES

The present invention relates to tracks for track laying vehicles, which are particularly suitable for tracklaying agricultural tractors.

The tracks used on track laying agricultural tractors usually comprise a plurality of links pivoted together to form a chain in a closed loop, to which links are fixed respective soles provided with ground engaging cleats which extend transverse the sole with respect to the length of the chain formed by the links.

The principal factors which, other things being equal (weight, driving force, resistance etc.), may affect the grip of traditional tracks of the above type, thereby reducing the tractive effort which such tracks are capable of exerting on tough agricultural land, are: the ability of the sole cleats to penetrate into the soil (this may be due to poor cleat design, to the hardenss of the soil, or to the formation, by adhesion, of deposits of soil on the soles between one cleat and the next); and the tendency of the soil to shear slippage particularly slippage of the "tiles" or blocks of earth defined between two adjacent cleats.

These factors are of greatest importance when an agricultural tractor is employed in operations, such as ploughing, where it is towing a tool which projects a significant distance into the soil, particularly when working up the incline of a sloping plot; even if the slope of the land is slight the extra traction required can be considerable and can make all the difference between secure adhesion of the tracks and slippage. In order to increase the adhesion in these cases, it would be possible artificially to increase the weight of the tractor, for example by loading it with concrete blocks, but this, at the least, would require a greater motor power in the vehicle and is not a very satisfactory solution.

The present invention seeks, therefore to provide a track for a track-laying vehicle which is able to exert, even on tough compacted ground, a greater tractive effort than has hithertofore been obtainable with conventional tracks.

According to the present invention a track for a track-laying vehicle such as an agricultural tractor, comprises a plurality of links pivoted together to form a closed loop chain, a plurality of soles fixed to respective links, each sole having respective ground engaging cleats, characterised by the fact that the cleats of adjacent soles are offset from one another in a direction transverse the length of the track.

Tracks formed as embodiments of this invention are able, with the same pressure on the ground and the same pressure on the cleat, to exert a greater tractive force than conventional tracks; this is further improved because the tractive effort is spread over a greater area of ground, between two adjacent cleats, than is the case with a conventional track.

In a preferred embodiment of the invention, alternate soles are of a first type having two ground engaging cleats aligned with one another across the width of the track and separated by a space, and between the soles of the first type are located soles of a second type having a single cleat aligned along the length of the track with the said space between the two ground engaging cleats of the adjacent soles of the first type, the width of the single cleat of the soles of the second type in a direction transverse the length of the track being substantially the same as that of the spaces between the two cleats of the soles of the first type.

By this means the effective longitudinal separation between adjacent cleats is double that of adjacent soles and of adjacent track links, so that the length of the "tiles" of soil trapped between two adjacent cleats have a length which is twice that trapped between two adjacent cleats of a conventional track having the same link and sole dimensions and in which the soles are all of the same type having a single transverse cleat. This doubling of the length of the "tile" of soil trapped between adjacent cleats gives a corresponding increase in the tractive effort which the track may exert without experiencing the slipping due to the horizontal sliding of the 'tile' of soil with respect to the rest of the ground. Moreover embodiments of this invention produce the above described improved results without excessively complicating the construction of the track.

Two embodiments of the invention will now be more particularly described, by way of example, with reference to the accompanying drawings, in which.

Figure 1:
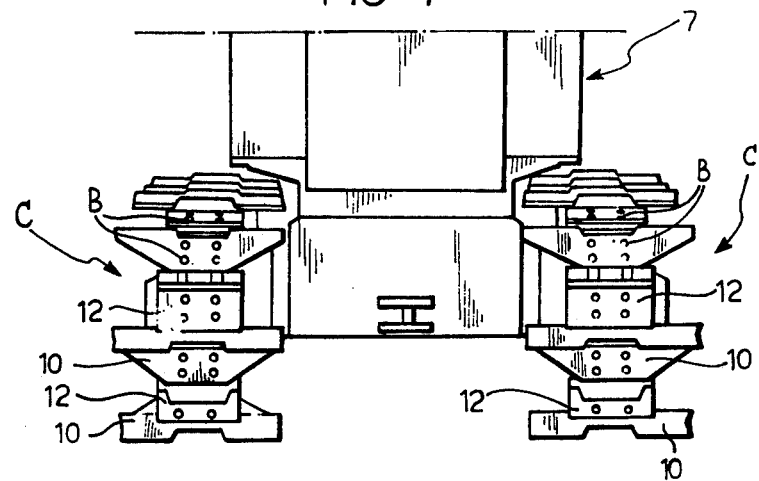
FIG. 1 is a schematic rear view of an agricultural tractor fitted with tracks each formed as a first embodiment of the present invention.

Referring now to FIG. 1, there is shown schematically an agricultural tractor T fitted with a pair of tracks C each of which comprises, in a known way, a plurality of flat links pivoted together to form a closed loop of chain which passes over a plurality of wheels (not shown) of the vehicle. To these links, by means of bolts B, are fixed respective soles, each sole being one of two types and adjacent soles being of different type. Thus, alternate soles are of a first, wider, type 10, whilst between these are soles of a second, narrower, type 12.

Figure 2:
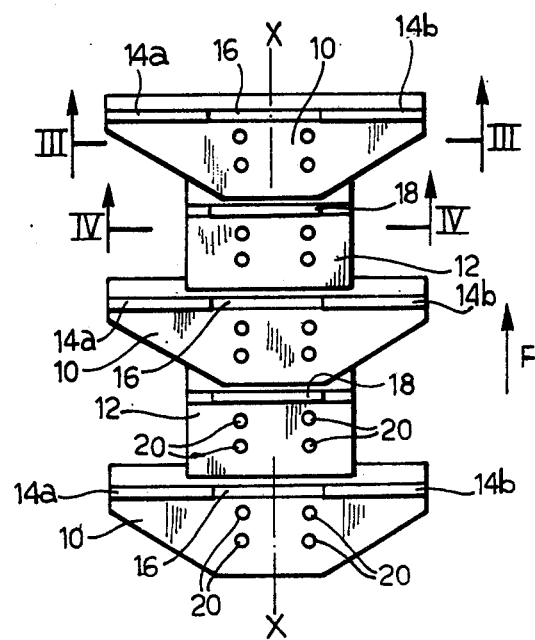
FIG. 2 is a plan view of a length of track formed as an embodiment of the present invention.
Figure 3:
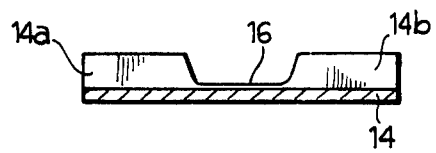
FIGS. 3 and 4 are cross sections taken on the lines III—III and IV—IV respectively of FIG. 2.
Figure 4:
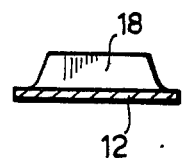

As also shown in FIGS. 2 to 4, each of the wider soles 10 is provided with a pair of cleats 14a, 14b aligned with one another transversely of the track and arranged symmetrically on either side of a longitudinal axis X—X of the track. The two cleats 14a, 14b are separated by a space 16.

The narrower soles 12 are different in form from the soles 10, being provided with a single cleat 18 which is located centrally of the sole and extends transversely thereacross, again symmetrically on either side of the longitudinal axis X—X. The cleat 18 of the narrower sole 12 is of substantially the same width across the track as the space 16. Because of this, as the vehicle moves along, the various cleats penetrate into the ground at a spacing which, along the length of the track, is twice the length of the sole: the tread pattern formed by the cleats comprises pairs of parallel 'tiles' defined between successive cleats 14a, 14b respectively and, between the tiles of each successive pair, a single row of "tiles" of the same length but displaced longitudinally by half the length of the "tile" that is by the length of one sole, and defined between the cleats 18 of the narrower sole 12.

In the arrangement shown in FIGS. 1 to 4, which has provided best results in practical tests the lateral extent, that is the width of each cleat 14a, 14b of the wider soles 10 in a direction transverse the length of the track, is substantially the same as that of the single cleat 18 of the narrower soles 12. The narrower soles 12 have, in a direction transverse the track, a width which corresponds substantially to the transverse extent, or width, of their single cleat 18. The wider soles 10 have, in plan view as shown in FIG. 2, a tapered form, the width of the soles 10, transverse the track, being less at the rear of the sole than at the front (front and rear being defined in relation to the direction of circulation of the soles around the track, which is indicated by the arrow F in FIG. 2). The width, transverse the track of the narrow rear part of the wider soles 10 being substantially the same as the width of the narrower soles 12.

Soles made as embodiments of the invention as shown in FIGS. 1 to 4 may be mounted without any modification on the links of normal chains of conventional tracks, in place of conventional soles. For this purpose, both the wider soles 10 and the narrower soles 12 have four securing holes 20 of the same size and in the same positions as those of conventional soles, for the passage of bolts B shown in FIG. 1.

Figure 5:
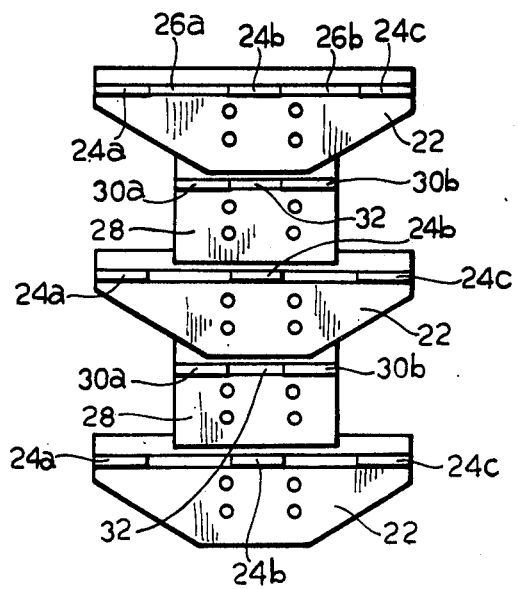
FIG. 5 is a plan view like FIG. 2, of a length of track formed as a second embodiment of the invention.

Many modifications can be made to the specific embodiment described above, provided that the cleats of adjacent soles are not aligned with one another along the length of the track. Thus, in FIG. 5, there are shown soles of a first, wider, type 22, which have three cleats 24a, 24b, 24c aligned with one another across the width of the track and separated by spaces 26a, 26b. Between soles 22 there are soles of a second, narrower, type 28 which have a pair of cleats 30a, 30b which are also aligned with one another across the width of the track; the cleats 30a, 30b are separated by a space 32 and are spaced from a median longitudinal line of the track by the same distance as the spaces 26a, 26b which separate the three cleats 24a, 24b, 24c of the wider sole. Thus the cleats of adjacent soles are not in alignment with one another along the length of the track, the cleats 30a, 30b being aligned with respective spaces 26a, 26b, whilst the cleats 24b are aligned with spaces 32: the cleats 24a and 24c are spaced further from the mid-line of the track than any other cleats and are therefore not aligned with any other cleats. Again, the 'tiles' defined on the ground, between adjacent longitudinally aligned cleats are of a length equal to twice the longitudinal separation between cleats of adjacent soles.

It will be appreciated that adjacent soles need not necessarily have different transverse widths: the soles may all have the same width, but the cleats must be staggered laterally in relation to one another along the length of the track.

Tests were made on an agricultural tractor of 170 HP fitted with tracks such as are illustrated in FIGS. 1 to 4 and towing in one test a harrow and in another a plough. Normal soles used on tractors have a width of 450 mm; the wider soles, of the first type 10, had a width of 600 mm, whilst the narrower soles, of the second type 12, had a reduced width, of 200 mm. With this track according to the invention it became possible to use the tractor at full power with a lower gear (third as well as fourth), with a gain of 800–900 kg. of tractive force in relation to the same tractor equipped with its normal tracks provided with soles of 450 mm. This increase in traction is due to several factors, amongst which the most important are the greater ground 'grip' (since, as already mentioned the 'tiles' defined by the cleats are of twice the length of the soles), the tendency of the track to shed any "tiles" of earth trapped between adjacent cleats and torn up from the ground, because the space between adjacent tiles includes two articulated joints between adjacent soles (this facilitates penetration of the cleats into the ground by reducing clogging) and the greater ground surface involved in the gripping, given the increased overall width of the tracks.

What is claimed is:

1. A track for a track-laying vehicle such as an agricultural tractor, comprising:

a plurality of links, means for pivoting the links together to form a closed loop chain, a plurality of soles fixed to respective links, and ground engaging cleats on said plurality of soles, the cleats of adjacent soles being offset from one another in a direction transverse the length of the track, wherein alternate soles are of a first type having two of said ground engaging cleats aligned with one another across the width of said tracks and separated by a space, soles of a second type being located between said soles of said first type, said soles of said second type having a single cleat aligned along the length of the track with said space between said two ground engaging cleats of each of the adjacent soles of said first type, the width of said single cleat of said soles of said second type in a direction transverse the length of said track being substantially the same as that of said spaces between said two cleats of said soles of said first type and the width of said soles of said second type being less than that of said soles of said first type, and substantially the same as that of their single cleat.

2. A track as in claim 1, wherein said soles of said first type are tapered in plan form, being wider at the front part and narrower at the rear part in relation to the direction of circulation of said soles around said track, said narrower rear part of said soles of said first type having a width substantially the same as that of said soles of said second type.

* * * * *